June 25, 1929.  S. MALKE  1,718,793
BUFFING AND CEMENTING
Filed June 30, 1926  3 Sheets-Sheet 1
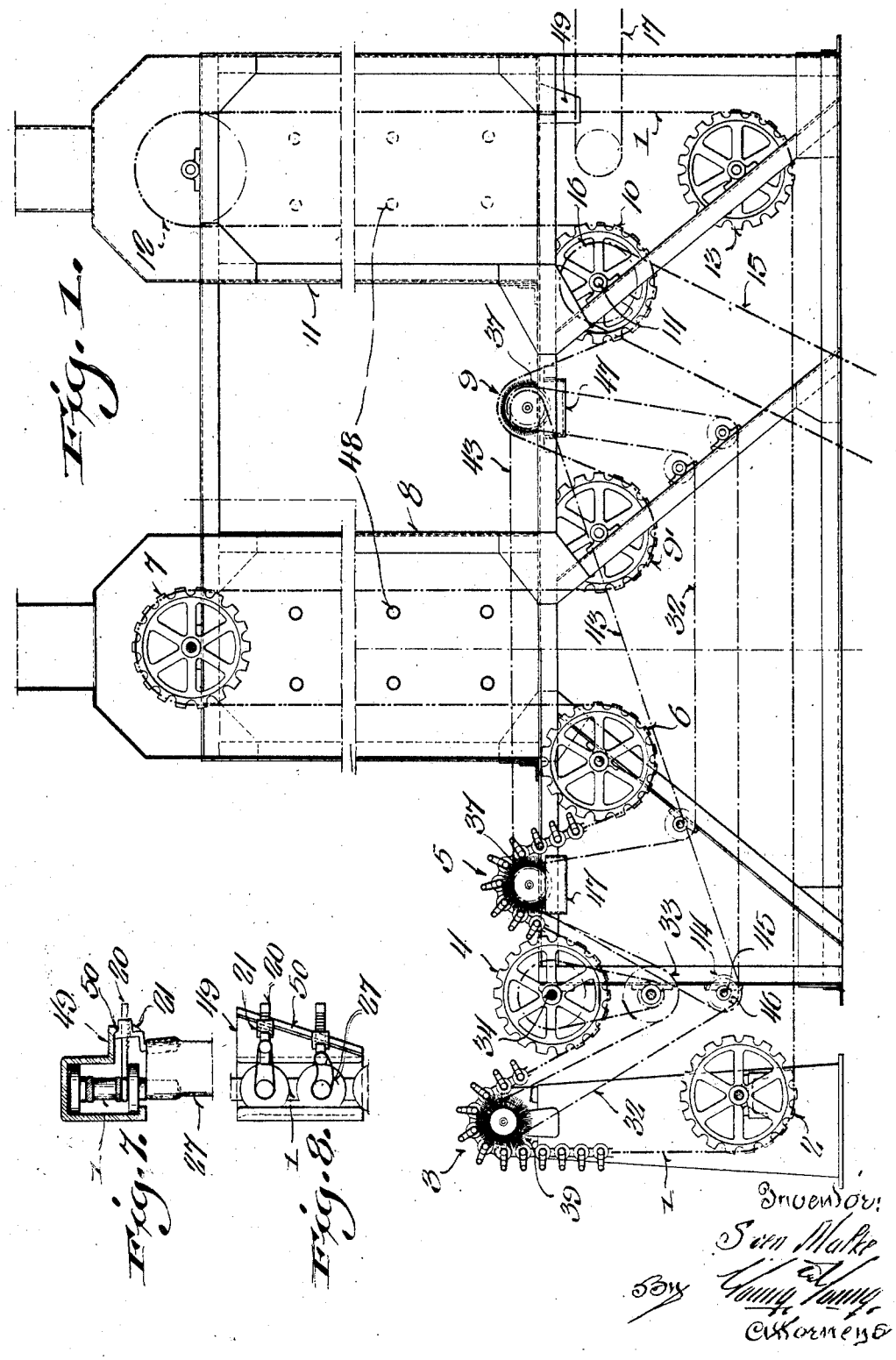

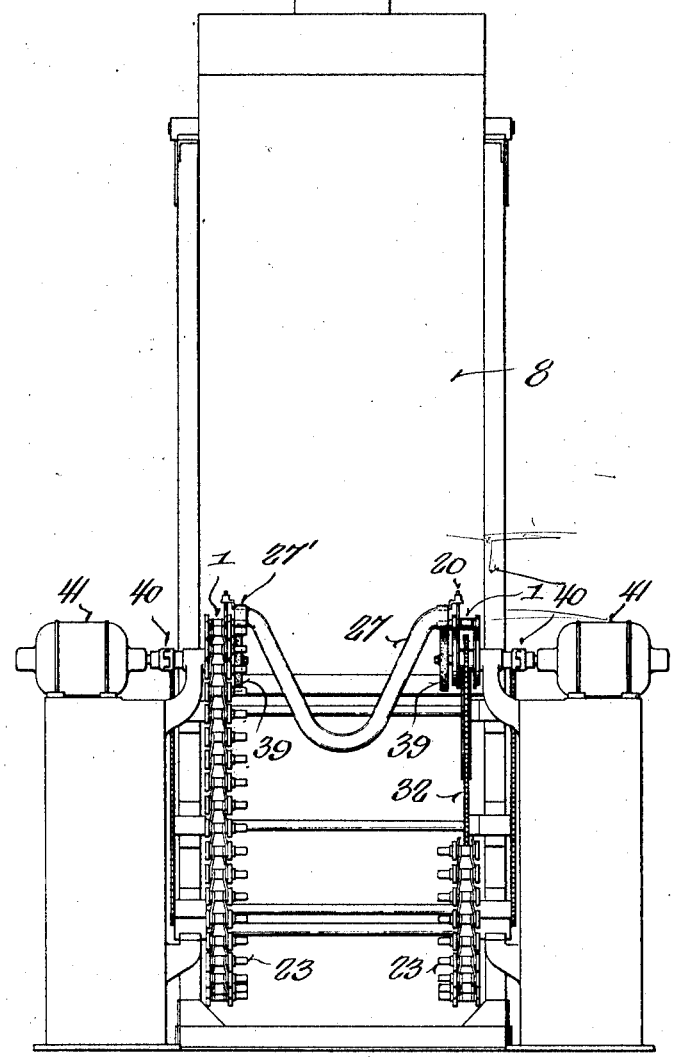

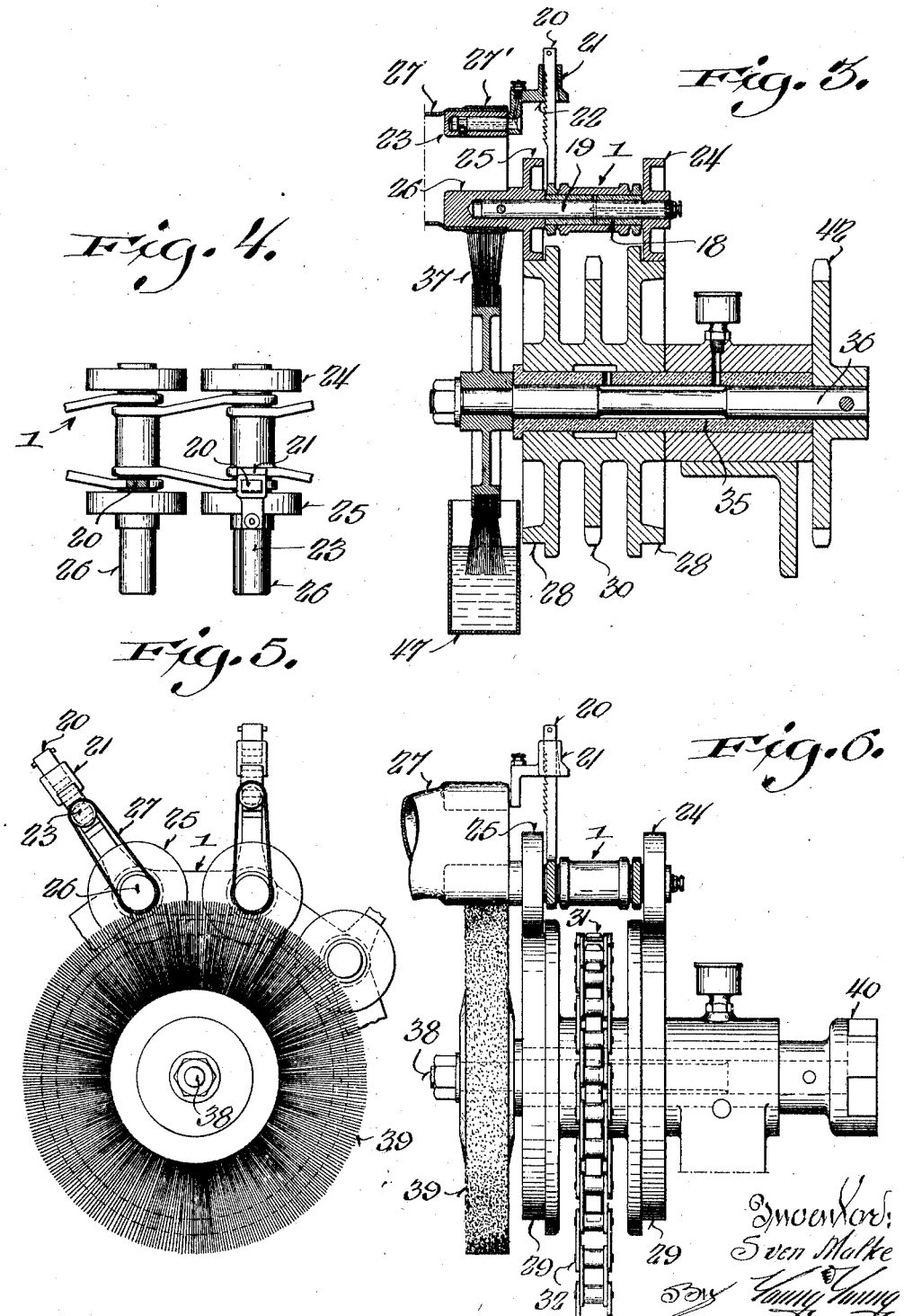

Patented June 25, 1929.

1,718,793

UNITED STATES PATENT OFFICE.

SVEN MALKE, OF MILWAUKEE, WISCONSIN.

BUFFING AND CEMENTING.

Application filed June 30, 1926. Serial No. 119,782.

This invention relates to a machine for preparing rubber tubes and is primarily directed to a machine for preparing the inner tubes of tires.

Heretofore, it has been the universal practice to receive the inner tubes in the correct lengths and manually roughen the outer portion adjacent one end and the inner portion adjacent the other end and manually apply cement to the ends.

These operations, as stated, have been performed by hand prior to this invention. Clearly, these operations are necessarily slow and expensive.

Objects of this invention are to provide a machine for abrading or buffing the ends of inner tubes and applying cement thereto in a wholly automatic manner, so that the tubes may be rapidly prepared by the machine with a marked reduction of cost and with the assurance that each joint will be properly and effectively prepared.

Further objects are to provide a tube treating or preparing machine which is provided with means for conveying the tubes through the machine and holding them adjacent their ends while they pass the buffing and cementing mechanisms so that the ends will be correctly prepared and ready for splicing.

Further objects are to provide a novel form of machine in which the conveyor is provided with holding means for the ends of the tubes so constructed that the holding means will hold the ends distended and will rotate such ends to present all portions of the appropriate surface to the buffing means and to the cement applying means.

Further objects are to provide means for partially drying the cement treated ends and for releasing the holders and for removing the inner tubes in their treated condition from the continuous conveyor.

An embodiment of the invention is shown in the accompanying drawings in which:—

Figure 1 is a side elevation partly in section showing the machine with parts diagrammatically indicated;

Figure 2 is a front elevation of the machine;

Figure 3 is a sectional view through the cement applying mechanism;

Figure 4 is a fragmentary view of a portion of the conveyor;

Figure 5 is an end view of the buffing means;

Figure 6 is a side view of the buffing means;

Figure 7 is a sectional view through a portion of the conveyor showing the holders as they appear when being tripped or released;

Figure 8 is a side view of the structure shown in Figure 7.

The machine comprises an endless conveyor, indicated generally by the reference character 1, which is provided with holders adapted to receive the ends of the inner tube. This conveyor consists, in reality, of a pair of spaced chains located on opposite sides of the machine, as indicated in Figure 2. The conveyor travels vertically upwardly from the guiding sprockets 2 (see Figure 1) and passes the buffing means, indicated generally at 3. From this point the conveyor passes downwardly below the sprocket wheels 4, and past the cementing means, indicated generally at 5. From this point, the conveyor passes beneath the guiding sprockets 6 and upwardly over guiding sprockets 7, located in the upper portion of the drying or heating chamber 8. From this point, the conveyor passes downwardly over the sprocket wheels 9' and from thence past a second cement applying means 9. From this point, the conveyor passes downwardly beneath guiding sprockets 10 and upwardly into a second drying or heating chamber 11. From this point, the conveyor passes upwardly over the sprocket wheels 12 and downwardly beneath the sprocket wheels 13, from which point it returns adjacent the base of the machine to the sprocket wheels 2. The power may be applied at any desired point in the system. For example, the shaft 14 may rigidly carry the sprocket wheels 10 and may be driven by means of a chain 15 passing over a sprocket wheel 16, rigidly mounted on the shaft 14. Thus, the entire conveyor travels continuously through the machine and is adapted to receive a large number of inner tubes and to simultaneously treat them as they pass through the machine.

A second or discharge conveyor 17 may be positioned adjacent the downwardly extending portion of the main conveyor 1, as shown on the right hand side of Figure 1, the action of such conveyor being described in greater detail hereinafter.

The conveyor, indicated generally by the reference character 1, is shown in greatest detail in Figures 3 to 5. This conveyor is formed by means of a plurality of connecting links, the links being carried upon suitable sleeves 18 (see Figure 3) which, in turn, form bearings for revoluble shafts or pins 19. One of each pair of links is provided with an upwardly extending support 20 provided with a plurality of ratchet teeth, as indicated in Figure 3. This support, in turn, carries a movable support 21 which is slidably mounted thereon, and provided with a tongue or projection 22, adapted to engage the teeth when the support is tilted, as indicated in Figure 3. The support 21 revolubly carries a roller or drum 23.

It is to be noted further from reference to Figure 3 that the revolubly mounted shaft 19 carries at one end a small roller or wheel 24. At the other end, it carries a similar wheel 25 which is provided, preferably, with an integrally formed drum or roller 26. The inner tube 27 has its ends slipped over the supporting rollers which, in reality, form supports for such inner tubes. Thereafter, the operator moves the movable support outwardly, thus expanding the inner tube. One end of the inner tube, for instance that end as shown in Figure 3, is turned outwardly on itself, as indicated at 27', so as to present its normally inner surface outwardly for the reversely turned portion. The wheels 24 and 25 travel upon drums or flanged wheels 28 adjacent the cementing means, as indicated in Figure 3. Similarly, the wheels 24 of the conveyor travel on flanged wheels 29 adjacent the buffing means. Each of these flanged wheels is integral with a sprocket wheel, the sprocket wheel for the cementing means being indicated by the reference character 30, and the sprocket wheel for the buffing means being indicated by the reference character 31 in Figures 3 and 6 respectively. These sprocket wheels 30 and 31 are driven by means of a chain 32 (see Figures 1 and 6) which passes over each of the sprocket wheels and which passes beneath a sprocket wheel 33, as shown in Figure 1. This sprocket wheel is driven by means of a suitable chain and sprocket connections from the shaft 34 of the sprocket wheels 4, as shown in Figure 1 so that motion is imparted to the chain 32. This chain is duplicated on opposite sides of the machine to drive the corresponding wheels 28 and 29 for rotating the holders as they are passing over the cementing and buffing means which, in turn, are located on opposite sides of the machine, as indicated in Figure 2.

It is to be noted in this connection that the chain 32 travels at a higher rate of speed than the conveyor and, consequently, causes the wheels 28 and 29 to rotate the wheels 24 and 25, and to thus rotate the inner tubes, as the ends of the inner tubes pass over the rollers 23 and 26, as shown in Figure 3. Thus, while the tubes are passing the buffing means and the cementing means, they are also rotated so as to present all of the surfaces thereof adjacent the ends of the tubes to the respective buffing and cementing means.

The mounting of the driving wheels 28 and 29 is identically alike and only one, therefore, has been shown in section, as indicated in Figure 3. From this figure, it will be seen that the wheels 28 and the sprocket wheel 30 are carried upon a sleeve 35, rigidly carried by a support on the frame work of the machine. This sleeve 35 also revolubly receives the independent shaft 36 for the cementing brush 37 in the case of the cement applying means. Similarly, in the case of the buffer the shaft 38, as may be seen from the dotted line shown in Figure 6, carries the buffing means or brush 39. Further, the shaft 38 carries a head 40 adapted for operative connection to the appropriate electric motor 41, as shown in Figure 2. Thus, the buffing wheels are rapidly driven directly from the motors 41. The means for driving the cement applying brushes or wheels 37 may comprise sprocket wheels 42 (see Figure 3) rigidly mounted on the ends of the shafts 36. These sprocket wheels 42 are driven by means of a chain 43 which passes over a sprocket wheel 44 rigidly mounted on a transverse jack shaft 45 (see Figure 1). This shaft also carries sprocket wheels 46 which receive the chain 32. Obviously, each of the chains 32 may pass over a sprocket wheel mounted on the shaft 45, if desired. In this manner, the motion of the chains 32 is transmitted to the chains 43 and thus the cement applying brushes are driven.

The operation of the machine is as follows:

The operator places the ends of the inner tubes on the supporting rollers 23 and 26 (see Figure 3) at the front end of the machine, that is, at the vertical upwardly passing stretch of the main conveyor 1, as shown at the left hand side of Figure 1. These tubes then pass the buffing means, indicated generally by the reference character 3, and the rapidly rotating brushes 39 of the buffing means suitably abraded or operated upon the ends of the inner tubes, it being noted that one of the ends is reversely turned, as shown at 27' in Figure 3. The supporting rollers 23 and 26 are free to rotate, as stated previously, and the roller 26 is driven through the medium of the driving wheels 29 and the driven wheels 24 and 25. This causes the inner tubes to rotate about their axes and present all of the appropriate surface to the action of the brushes. Thereafter, the tubes pass to the first cement applying means, as indicated generally by the reference character 5. Here, a similar action takes place, the wheels 24 and 25 being rotated by the driving wheel 28. However, the brush 37 is traveling at a lower rate than the abrading brush and also dips into a cement containing receptacle 47, as may be seen from Figure 3. This brush, therefore, evenly applies cement to the abraded portions at the ends of the inner tube. From this point, the conveyor passes upwardly into the first drying chamber 8.

From this point, it passes to the second cement applying means 9 which is identically similar to the cement applying means 5. From this point the conveyor passes into the second drying chamber 11. The drying chambers or hoods 8 and 11 are heated in any suitable manner, and are preferably open at the top and bottom, as indicated in Figure 1 to permit circulation of air therein. They may be heated by means of steam pipes 48, for example as indicated diagrammatically in Figure 1. When the inner tubes pass downwardly from the drying chamber 11, they are received by the conveyor 17.

The means for detaching the inner tubes from their supports will now be described. This means comprises a pair of cam-like slanting plates 49 mounted on opposite sides of the conveyor 1, as shown on the right hand end of Figure 1 and in greater detail in Figures 7 and 8. These plates 49 are provided with inwardly extending flanges 50 at their slanting edges, such flanges engaging the outwardly extending lug of the supports 21, and causing such supports to tilt into the position shown in Figure 7 against the pull of the inner tube. This permits detachment to occur between the supports 21 and the standards or projecting members 20 and allows the movable support to move inwardly, thus slackening the tension on the inner tube and allowing it to freely rest upon such supports, as indicated in the lower portion of Figure 8. The body of the inner tube is received by the conveyor 17 which thus carries them away from the conveyor 1, while the supports are in their detached or loosened condition.

It is to be understood that the drying chambers do not completely dry the applied cement, but merely partially dry it rendering it extremely sticky and tenacious.

It is, of course, to be understood that the tubes after being treated by this machine are adapted to have one end inserted in the other end, and the cemented portions pressed together to complete the operation of joining the tubes, although this last operation forms no part of this invention.

It will be seen, therefore, that a machine has been provided which performs the heretofore manually performed operations of preparing the ends of inner tubes by buffing or abrading them, and by applying cement to such buffed portions. Further, this machine presents the inner tubes for the next operation, that is, inserting one end into the other in identically the same condition, so that a uniform product necessarily results. Clearly therefore, the exact speed at which the machine is to operate, the temperature of the drying chambers, and other variables of this type, may be predetermined with absolute certainty in this machine, with the net result that the product of the machine will have the highest quality and uniformity.

Although the invention has been described in considerable detail, such description is intended as illustrative rather than limiting as the invention may be variously embodied and as the scope of such invention is to be determined as claimed.

I claim:

1. In a machine for preparing inner tubes, the combination of a conveyor having holding means adapted to remain expanded and hold the ends of such tubes in expanded position, buffing means for operating upon such ends, means for applying cement to said ends, means for releasing the holders, and a second conveyor for receiving the tubes when they are released from said holders.

2. A machine for preparing inner tubes, comprising a conveyor having a series of holders for the ends of the inner tubes, each holder comprising spaced and revolubly mounted drums, buffing means for operating upon the ends of such inner tubes, means for applying cement to such ends after they have been buffed, means for rotating said drum while the inner tubes are passing the buffing and cementing means, and means for causing the drums to approach each other to thus release the inner tubes after they have passed the cementing means.

3. A machine for preparing inner tubes, comprising an endless chain, bearing members carried by said chain and each provided with a revolubly mounted roller, said rollers being adapted for positioning within the ends of the inner tubes, means for causing one of the rollers to rotate to thereby rotate the inner tube, and means for applying cement to the ends of the inner tubes.

4. A machine for preparing inner tubes, comprising an endless chain, said chain being provided with a plurality of holders for receiving the ends of inner tubes, said holders comprising revolubly mounted spaced drums, one of said drums being bodily movable towards and from the other drum, means for rotating said drums, means for permitting one of said drums to move inwardly towards the other drum, and means for applying cement to the ends of the inner tubes.

5. A machine for preparing inner tubes, comprising an endless chain, said chain being provided with bearing members revolubly supporting a pair of drums for receiving the ends of inner tubes, one of said bearing members being normally latched in spaced relation to the other bearing member, means for rotating said drums, means for tripping the latched bearing members, whereby the drums carried by such last mentioned bearing members are permitted to move towards the other drums, and means for applying cement to the ends of the inner tubes.

In testimony that I claim the foregoing I have hereunto set my hand at Milwaukee, in the county of Milwaukee and State of Wisconsin.

SVEN MALKE.